US012565140B1

(12) United States Patent
Chen

(10) Patent No.: US 12,565,140 B1
(45) Date of Patent: Mar. 3, 2026

(54) ADJUSTABLE PROJECTION DEVICE FOR MOUNTING ON VEHICLE CHASSIS

(71) Applicant: Shining Victory International Holdings Co., Limited, Kowloon (HK)

(72) Inventor: Keng-Sheng Chen, New Taipei (TW)

(73) Assignee: Shining Victory International Holdings Co., Limited, Kowloon (HK)

( * ) Notice: Subject to any disclaimer, the term of this patent is extended or adjusted under 35 U.S.C. 154(b) by 0 days.

(21) Appl. No.: 19/233,995

(22) Filed: Jun. 10, 2025

(51) Int. Cl.
*B60Q 1/26* (2006.01)
*B60Q 1/50* (2006.01)

(52) U.S. Cl.
CPC ............. *B60Q 1/2626* (2013.01); *B60Q 1/50* (2013.01); *B60Q 2400/50* (2013.01)

(58) Field of Classification Search
CPC .... B60Q 1/0483; B60Q 1/068; B60Q 1/0686; B60Q 1/14; B60Q 1/18; B60Q 1/24; B60Q 1/2626; B60Q 1/50
USPC ........ 362/523, 524, 538, 547, 287, 427, 428
See application file for complete search history.

(56) References Cited

U.S. PATENT DOCUMENTS 8,414,156 B2 * 4/2013 Polasek ................ G05B 19/404
362/372
12,319,196 B2 * 6/2025 Weber .................... B60Q 1/247

2010/0254147 A1 * 10/2010 Tsao ......................... F21V 21/30
362/371
2014/0177258 A1 * 6/2014 Gebhard ................ B60Q 1/245
362/547
2017/0371235 A1 * 12/2017 Yokoyama .............. F21S 43/26
2022/0348134 A1 * 11/2022 Beernaert ................ B60Q 1/26

FOREIGN PATENT DOCUMENTS

TW              M410844 U      9/2011

* cited by examiner

*Primary Examiner* — Thomas M Sember
(74) *Attorney, Agent, or Firm* — RABIN & BERDO, P.C.

(57) ABSTRACT

Provided is an adjustable projection device for mounting on a vehicle chassis, including: a bracket assembly and a projection lamp assembly, wherein the bracket assembly comprises: a base fixed to the vehicle chassis; two fixed brackets fixed to the base; and a movable bracket rotatably fixed to the fixed bracket. The rotatable connection of the fixed brackets and movable bracket includes a first annular gear plate and a second annular gear plate connected by an adjustment element. When the adjustment element is locked so that the first and second annular gear plates are engaged with each other, the movable bracket cannot rotate relative to the fixed bracket; when the adjustment element is loosened so that the first and second annular gear plate are not engaged with each other, the movable bracket can rotate relative to the fixed bracket, thereby adjusting the projected image.

6 Claims, 6 Drawing Sheets

ADJUSTABLE PROJECTION DEVICE FOR MOUNTING ON VEHICLE CHASSIS

BACKGROUND OF THE INVENTION

1. Field of the Invention

The present invention relates generally to the field of vehicle accessories, and more particularly, to an adjustable projection device for mounting on a vehicle chassis.

2. The Prior Arts

For decorative purpose to enhance a sense of sophistication or luxury to the vehicle, some models of commercially available vehicles are equipped with projection lamps. When the projection lamps are activated, patterns or text images can be projected onto the ground or at appropriate locations on the vehicle body. For example, the projection lamp can be installed on the chassis of the vehicle and connected to the vehicle's power supply. When the door is opened, the projection lamp is automatically started through sensing to project a pattern or text image on the ground, thereby highlighting the visual sensory effect at night or in a dimly lit environment. The pattern or text may be a car brand's logo, trademark, or any pattern and text.

Conventional projection lamps are developed and designed based on different car models and sizes. That is, projection lamps of specific specifications can only be installed on corresponding car models so that the projected image can obtain accurate focus. In addition, the size, direction and angle of the projected image are fixed and cannot be adjusted to satisfy personal preferences.

SUMMARY OF THE INVENTION

A primary objective of the present invention is to provide a projection device that can adjust the direction, angle and size of image projection according to personal preference, especially an adjustable projection device for mounting on a vehicle chassis.

To achieve the aforementioned objective, the present invention provides an adjustable projection device for mounting on a vehicle chassis, comprising: a bracket assembly and a projection lamp assembly, wherein the bracket assembly further comprises: a base fixed to the vehicle chassis; two fixed brackets, respectively fixed to opposite sides of the base, and opposite surfaces of the two fixed brackets are symmetrically formed with first annular gear plates; and a movable bracket, formed with a pair of lugs located on opposite sides thereof, and the pair of lugs are symmetrically formed with second annular gear plates, and the second annular gear plates are connected to the center of the first annular gear plates by an adjustment element; wherein, by operating the adjustment element, the second annular gear plates and the first annular gear plates can be meshed with each other to make the movable bracket non-rotatable relative to the fixed bracket; wherein, by operating the adjustment element, the second annular gear plates and the first annular gear plates can be non-meshed with each other to make the movable bracket rotatable relative to the fixed bracket; the projection lamp assembly is connected to the movable bracket and rotates with the rotation of the movable bracket, thereby adjusting the direction, angle, and size of a projected image.

In one embodiment of the present invention, at least one arc-shaped slot hole is provided on a horizontal surface of the base, and a fixing screw is passed through the arc-shaped slot hole to fix the base to the vehicle chassis. Accordingly, during installation, the base can be rotated horizontally with the fixing screws loosened, thereby adjusting the direction of the projected image horizontally.

In one embodiment of the present invention, the first annular gear plates are formed on the two fixed brackets facing each other, and the second annular gear plates are formed on the pair of lugs facing away from each other. Accordingly, the first annular gear plate and the second annular gear plate can face each other.

Preferably, a screw hole is formed at the center of the second annular gear plate, a center hole is formed at the center of the first annular gear plate, and the adjustment element is formed with an external thread; a center connection between the second annular gear plate and the first annular gear plate is completed by passing the adjustment element through the center hole and locking the external thread into the screw hole. Accordingly, when the adjustment element is locked, the first annular gear plate and the second annular gear plate are engaged with each other, and when the adjustment element is loosened, the first annular gear plate and the second annular gear plate can be separated from each other or incompletely engaged and locked, so that the adjustment bracket becomes rotatable to adjust the angle and size of the image projected by the projection lamp assembly on the ground.

In one embodiment of the present invention, the projection lamp assembly further comprises: a shell; a lens assembly, disposed inside the shell, the lens assembly comprising an image element; a lamp board assembly, disposed inside the shell, the lamp board assembly comprising a circuit board and a light-emitting element electrically connected to the circuit board, the light generated by the light-emitting element projects the image from the image element to outside of the shell through the lens assembly; and a heat sink, connected to the shell for absorbing and dissipating the heat generated by the lamp board assembly, the heat sink is fixedly connected to the movable bracket.

Preferably, a plurality of fins is formed on the outer surface of the heat sink. Accordingly, the heat generated by the lamp board assembly can be effectively and quickly transferred to the fins and then dissipated.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
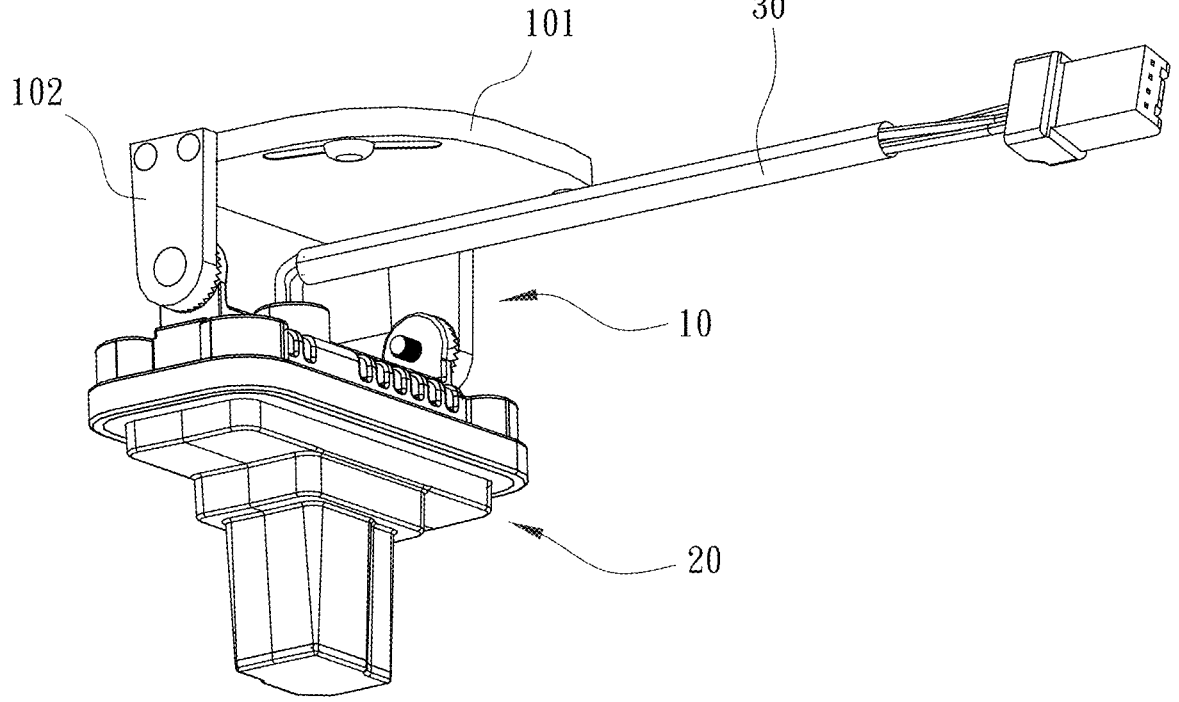
FIG. 1 is a perspective view showing the appearance of the projection device of the present invention after assembly.
Figure 2:
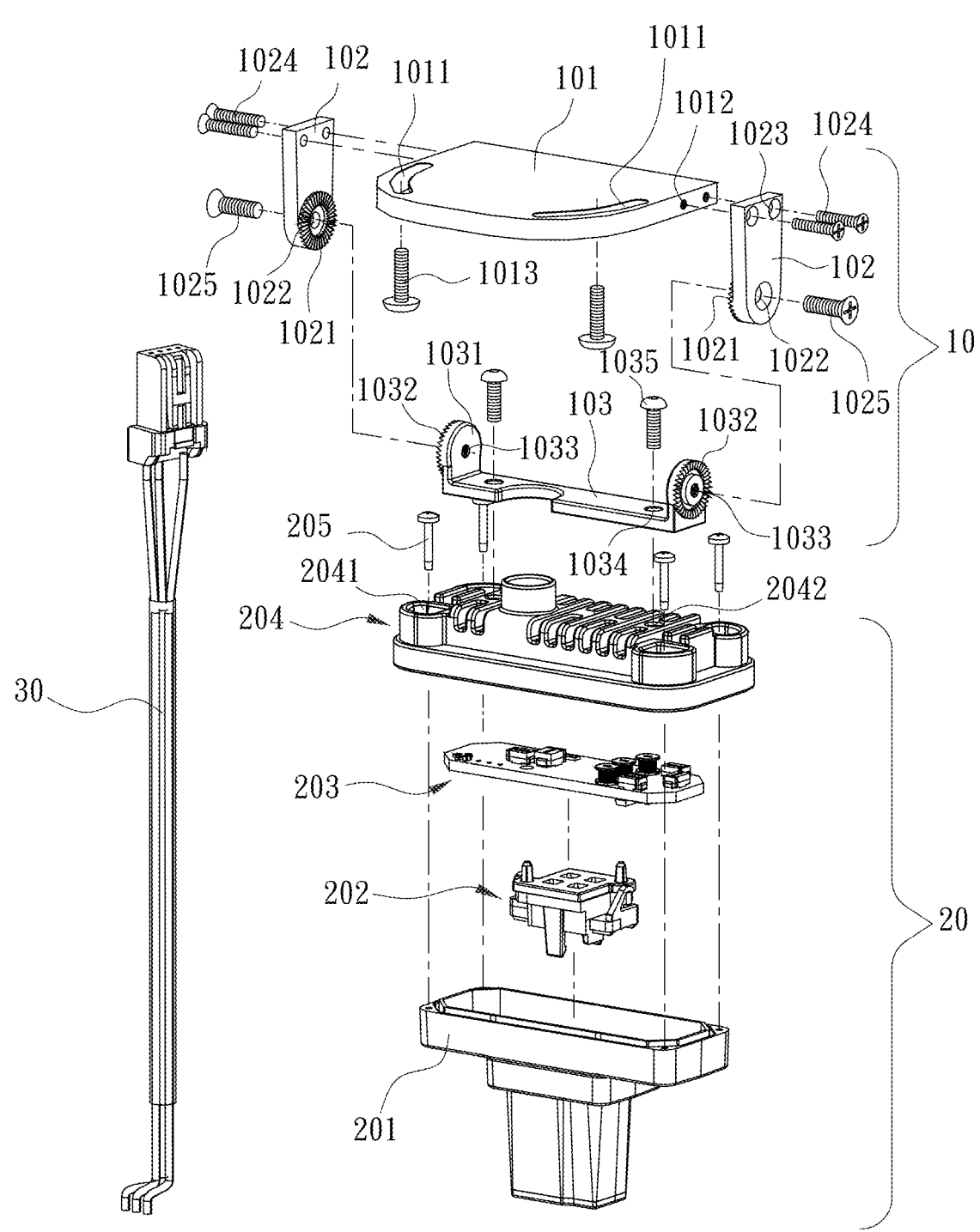
FIG. 2 is a perspective exploded view showing the relationship between the components of the projection device of the present invention.
Figure 3:
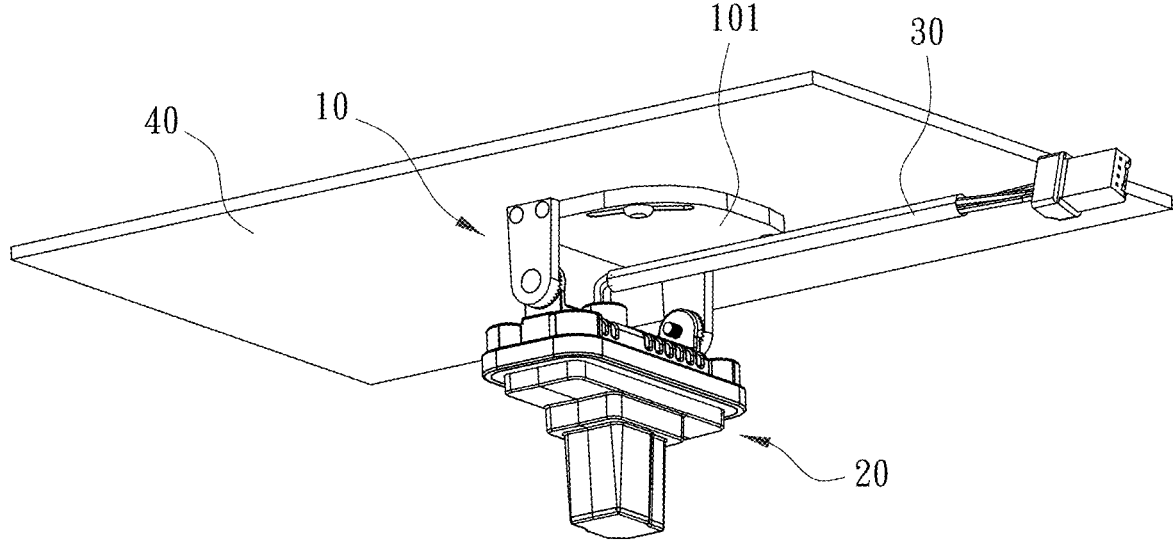
FIG. 3 is a perspective view showing the state of the projection device of the present invention mounted on the vehicle chassis.
Figure 4:
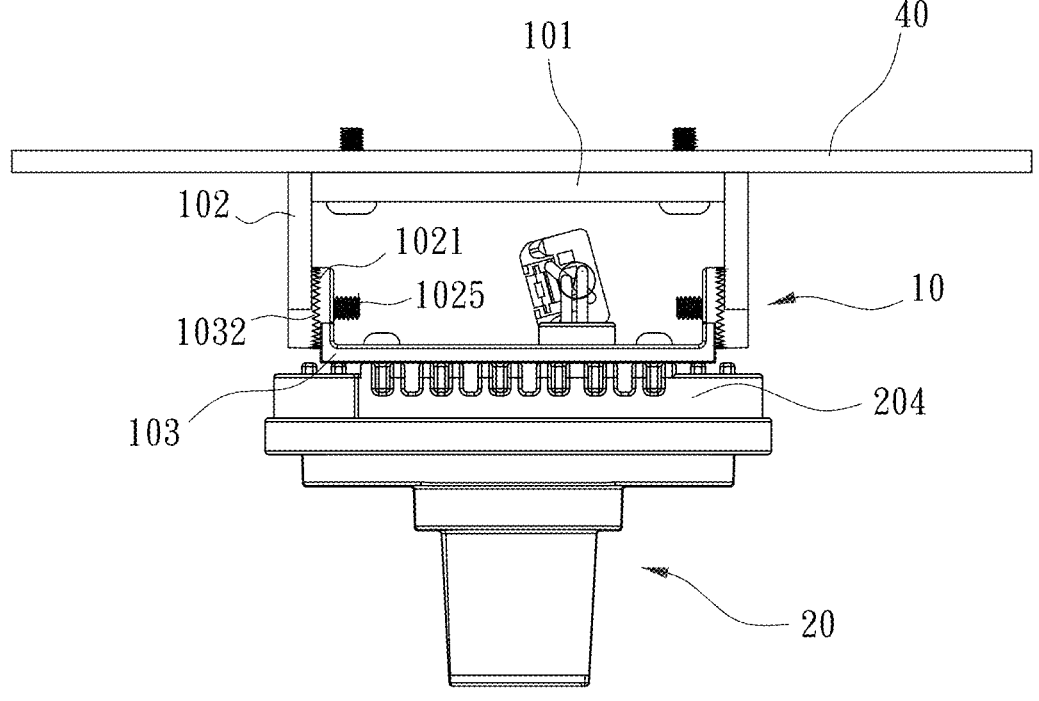
FIG. 4 is a planar view showing the state of the projection device of the present invention mounted on the vehicle chassis.
Figure 6:
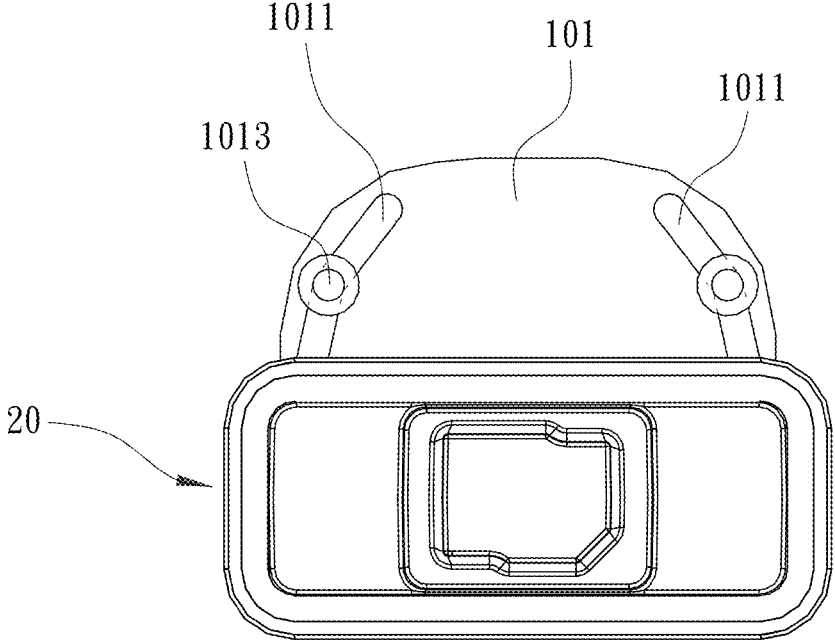
FIG. 6 is a planar view showing the base of the projection device of the present invention when mounted on the vehicle chassis.

As shown in FIG. 1 and FIG. 2, the adjustable projection device provided by the present invention is suitable for mounting on a vehicle chassis, and works in combination with sensors and circuits to control the automatic projection of images onto the ground when the vehicle door is opened, and interrupts the projection of images when the vehicle door is closed. The adjustable projection device includes a bracket assembly 10 and a projection lamp assembly 20. The bracket assembly 10 further includes a base 101, two fixed brackets 102, and a movable bracket 103; wherein the base 101 is a component fixed to the vehicle chassis 40 (as shown in FIG. 3), which may be a plate-shaped body, and is provided with at least one arc-shaped slot hole 1011 on its horizontal plane; preferably, the arc-shaped slot holes 1011 are symmetrical to each other on the planes on the two opposite sides thereof, thereby being fixed to the vehicle chassis 40 by passing at least one fixing screw 1013 through the arc-shaped slot hole 1011 (as shown in FIG. 3 and FIG. 4). The base 101 is rotatable in the horizontal direction (that is, the fixing screws 1013 move relatively along the arc-shaped slot holes 1011, as shown in FIG. 6) in the state where the fixing screws 1013 are not tightly locked, so as to adjust the direction of the base 101, and then tighten the fixing screws 1013. In addition, the two opposite side surfaces of the base 101 are respectively provided with screw holes 1012 for installing the fixed brackets 102.

The two fixed brackets 102 are respectively fixed to the opposite sides of the base 101. As shown in FIG. 2, the two fixed brackets 102 have an appropriate length, and first annular gear plates 1021 are symmetrically formed at one end of the opposite surfaces thereof, and a center hole 1022 is formed in the center of the first annular gear plate 1021; a hole 1023 is formed at the other end of the fixed bracket 102, and a fixing screw 1024 can be passed through the hole 1023 and then locked into the screw hole 1012 on the side of the base 101, so as to fix the two fixed brackets 102 to the opposite sides of the base 101 respectively.

As shown in FIG. 2, the movable bracket 103 has an appropriate length, and is integrally formed with a pair of lugs 1031 located on opposite sides, and each of the pair of lugs 1031 is symmetrically formed with a second annular gear plate 1032. More specifically, the pair of second annular gear plates 1032 are formed on the pair of lugs 1031 in a manner opposite to each other, and a screw hole 1033 is formed in the center of the second annular gear plate 1032. The second annular gear plate 1032 is connected to the center of the first annular gear plate 1021 via an adjustment element 1025. Specifically, the adjustment element 1025 has an external thread (such as a screw or a bolt) to connect the pair of first annular gear plates 1021 and the pair of second annular gear plates 1032. When the first and second gear plates are matched facing each other, the adjustment element 1025 is passed through the center hole 1022 and then locked into the screw hole 1033 to complete the connection.

Figure 5:
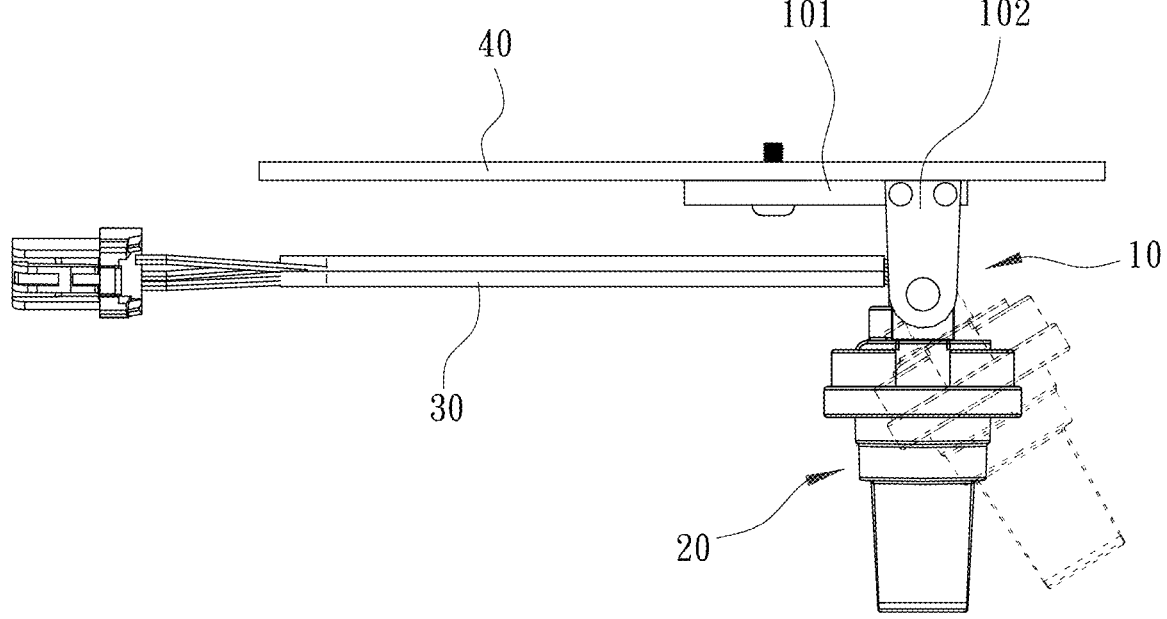
FIG. 5 is a schematic view showing that the projection image angle is adjustable when the base of the projection device of the present invention is mounted on the vehicle chassis.

Accordingly, as shown in FIGS. 4 and 5, when the adjustment element 1025 is tightened, the second annular gear plate 1032 and the first annular gear plate 1021 are engaged and fixed to each other, so that the movable bracket 103 cannot rotate relative to the fixed bracket 102. When the adjustment element 1025 is loosened, the second annular gear plate 1032 and the first annular gear plate 1021 can be separated from each other, and the movable bracket 103 can rotate relative to the fixed bracket 102, so that the angle of the movable bracket 103 relative to the fixed bracket 102 can be adjusted.

As shown in FIG. 2, the projection lamp assembly 20 is connected to the movable bracket 103 so as to rotate along with the rotation of the movable bracket 103, thereby adjusting the direction, angle, and size of the projected image. Specifically, the projection lamp assembly 20 includes a shell 201, a lens assembly 202, a lamp board assembly 203, and a heat sink 204; wherein the shell 201 is a hollow shell having a projection hole at one end (located at the lower end of the shell 201 shown in FIG. 2, not labeled); after the lens assembly 202 and the lamp board assembly 203 are assembled together in the shell 201, the heat sink 204 is covered and fixed to the shell 201.

The lens assembly 202 includes a modularly packaged lens and an image element (not shown). The image element is a film having a pattern, text, etc., and the image element is arranged on the optical path of the lens. The lamp board assembly 203 includes a circuit board and a light-emitting element (such as an LED) electrically connected to the circuit board. The circuit board is electrically connected to the vehicle's power supply via a power line 30. When powered on, the light-emitting element projects light through the lens assembly to project the image of the image element out of the shell 201. The lens assembly 203 and the lamp board assembly 203 are both conventional techniques and are not technical features claimed in the present invention, so further detailed description is omitted.

The heat sink 204 is formed to have a plurality of fins on its outer surface, and is provided with through holes 2041 at four corners, and a plurality of screw holes 2042 in the middle area; after the lens assembly 202 and the lamp board assembly 203 are installed in the shell 201 and the heat sink 204 is covered on the shell 201, the fixing screws 205 are passed through the through holes 2041 and then locked into the screw holes of the shell 201 to fix the heat sink 204 and the shell 201 to each other, and the movable bracket 103 is fixed by the fixing screws 1035 passing through the holes 1034 on the movable bracket 103 and then locked into the screw holes 2042 of the heat sink 204, so as to complete the connection between the bracket assembly 10 and the projection lamp assembly 20. The heat generated when the light-emitting element of the light board assembly 203 emits light can be transferred to the heat sink 204 and dissipated by a plurality of fins formed thereon.

As shown in FIGS. 4 and 5, after the projection device of the present invention is mounted on the vehicle chassis 40, the direction, angle, and image size of the image projected by the projection lamp assembly 20 can be adjusted by operating the adjustment element 1025. In other words, when the adjustment element 1025 is loosened, the second annular gear plate 1032 and the first annular gear plate 1021 no longer meshed with each other, and the movable bracket 103 can be rotated relatively to the fixed bracket 102, so that the angle of the movable bracket 103 and the projection lamp assembly 20 relative to the fixed bracket 102 can be adjusted, and then the adjustment element 1025 is tightened to make the second annular gear plate 1032 and the first annular gear plate 1021 mesh with each other again to fix the adjusted direction and angle. By adjusting the direction and angle of the projection lamp assembly 20, the size of the projected image can be adjusted simultaneously. That is, when the projected image is perpendicular to the ground, the image is smallest. When the angle between the output light of the projection lamp assembly and the ground is smaller (that is, the angle with the vertical line is larger), the image projected on the ground is larger. Therefore, the projection device of the present invention is suitable for mounting on the chassis of any type of vehicle, and provides convenient adjustment of the direction, angle, and size of the projected image.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An adjustable projection device for mounting on a vehicle chassis, comprising:

a bracket assembly comprising:

a base fixed to the vehicle chassis;

two fixed brackets respectively fixed to opposite sides of the base, and opposite surfaces of the two fixed brackets being symmetrically formed with first annular gear plates; and a movable bracket formed with a pair of lugs located on opposite sides thereof, and the pair of lugs being symmetrically formed with second annular gear plates, and the second annular gear plates being connected to a center of the first annular gear plates by an adjustment element;

wherein, by operating the adjustment element, the second annular gear plates and the first annular gear plates are meshed with each other to make the movable bracket non-rotatable relative to the fixed bracket;

wherein, by operating the adjustment element, the second annular gear plates and the first annular gear plates are non-meshed with each other to make the movable bracket rotatable relative to the fixed bracket; and a projection lamp assembly connected to the movable bracket and rotating with the rotation of the movable bracket, thereby adjusting a direction, angle, and size of a projected image.

2. The adjustable projection device for mounting on the vehicle chassis according to claim 1, wherein at least one arc-shaped slot hole is provided on a horizontal surface of the base, and a fixing screw is passed through the arc-shaped slot hole to fix the base to the vehicle chassis.

3. The adjustable projection device for mounting on the vehicle chassis according to claim 1, wherein the first annular gear plates are formed on the two fixed brackets facing each other, and the second annular gear plates are formed on the pair of lugs facing away from each other.

4. The adjustable projection device for mounting on the vehicle chassis according to claim 3, wherein a screw hole is formed at a center of the second annular gear plate, a center hole is formed at the center of the first annular gear plate, and the adjustment element is formed with an external thread; a center connection between the second annular gear plate and the first annular gear plate is completed by passing the adjustment element through the center hole and locking the external thread into the screw hole.

5. The adjustable projection device for mounting on the vehicle chassis according to claim 1, wherein the projection lamp assembly comprises:

a shell;

a lens assembly disposed inside the shell, the lens assembly comprising an image element;

a lamp board assembly disposed inside the shell, the lamp board assembly comprising a circuit board and a light-emitting element electrically connected to the circuit board, light generated by the light-emitting element projecting an image of the image element to outside of the shell through the lens assembly; and a heat sink connected to the shell for absorbing and dissipating heat generated by the lamp board assembly, the heat sink being fixedly connected to the movable bracket.

6. The adjustable projection device for mounting on the vehicle chassis according to claim 5, wherein a plurality of fins is formed on an outer surface of the heat sink.

\* \* \* \* \*